Figures 1, 3:
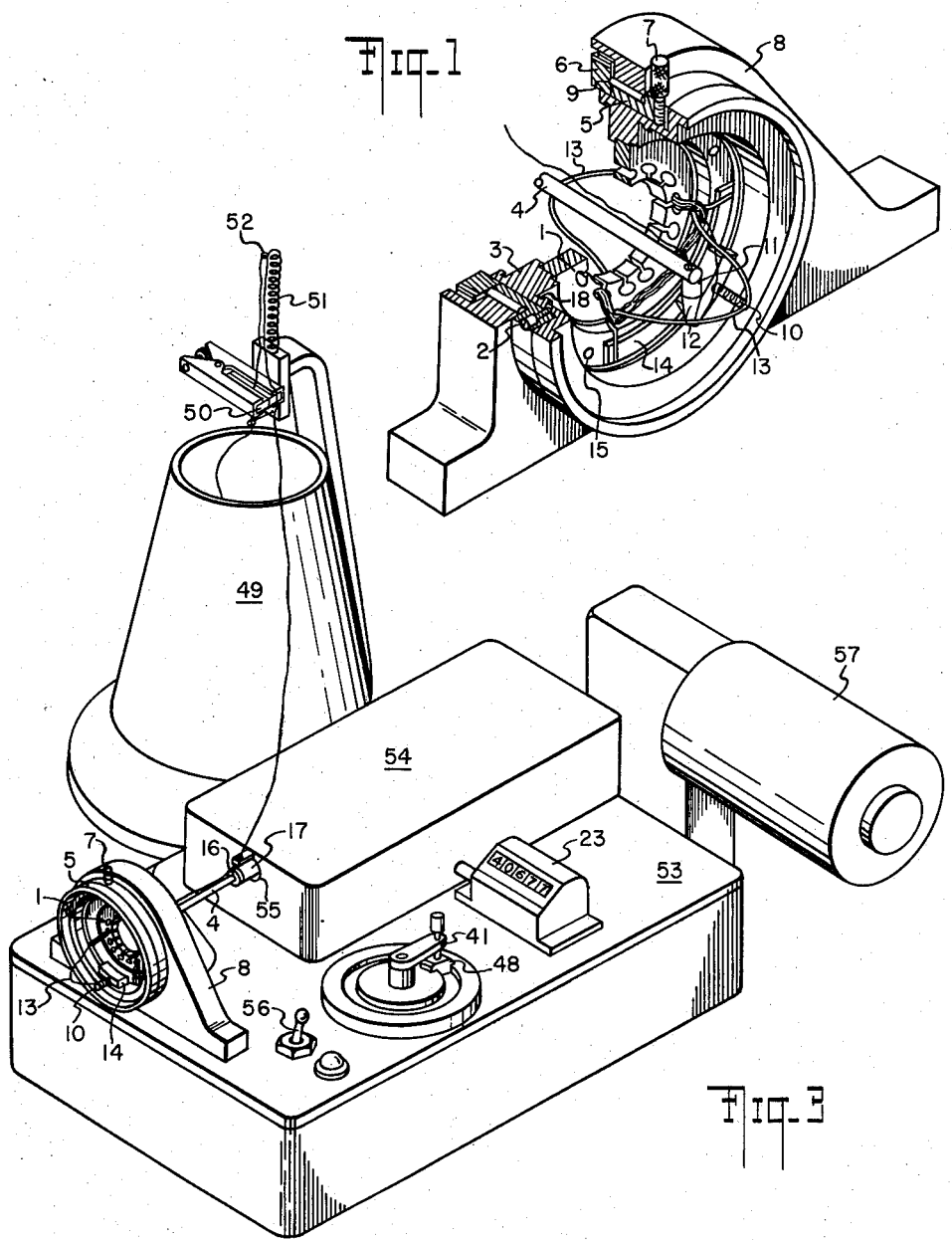

July 4, 1961

W. J. BATTY 2,991,021

STATOR WINDING MACHINE

Filed Nov. 1, 1957

2 Sheets-Sheet 1

INVENTOR
WILLIAM J. BATTY
BY
*Henry Huff*
ATTORNEY

July 4, 1961
W. J. BATTY
2,991,021
STATOR WINDING MACHINE
Filed Nov. 1, 1957
2 Sheets-Sheet 2
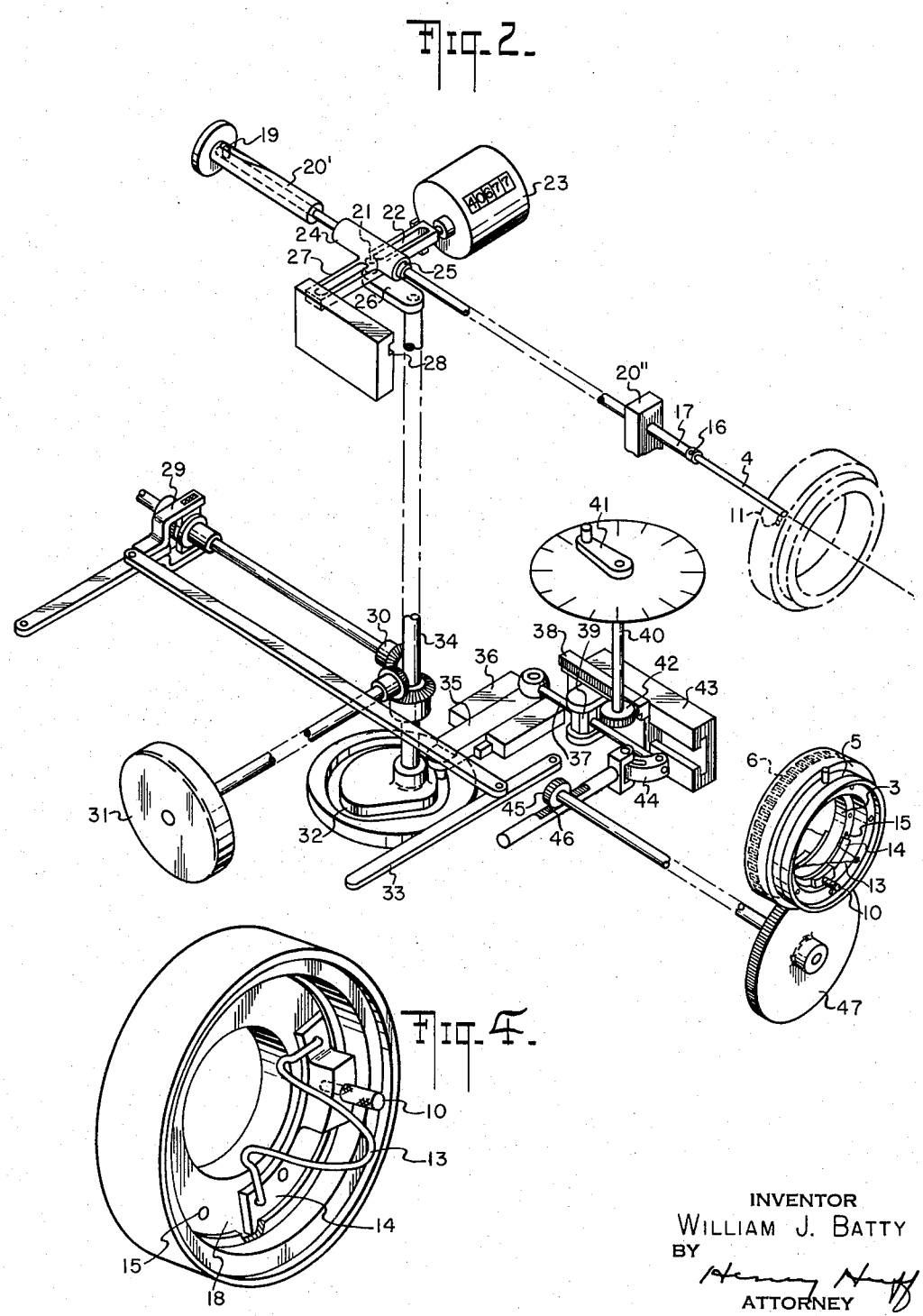
INVENTOR
WILLIAM J. BATTY
BY
ATTORNEY

United States Patent Office 2,991,021
Patented July 4, 1961

2,991,021
STATOR WINDING MACHINE
William James Batty, Ashford, England, assignor to The Sperry Gyroscope Company Limited, Brentford, Middlesex, England, a British company
Filed Nov. 1, 1957, Ser. No. 693,905
Claims priority, application Great Britain Nov. 23, 1956
2 Claims. (Cl. 242—1.1)

The invention relates to a method of, and apparatus for, automatically laying a winding or windings in slots formed in the inner cylindrical surface of a cylindrical core for an electrical machine, such as a motor or generator, and referred to in the following as the stator.

One object of the invention is the provision of a stator winding machine which can be used to wind stators of conventional design and utilising conventional fibre slotting-insulation and end fibres.

A machine according to the invention may readily be arranged to provide for the winding of stators with small diameter bores and to wind the stators with little risk of damage to the stator bores.

According to one aspect of the invention, a method of automatically laying a winding in a pair of slots formed in the inner cylindrical surface of a cylindrical core for an electrical machine includes detachably securing a pair of guides in fixed relation to the core and automatically moving a wire feeding head relative to the core in a closed path which has two sides respectively lying substantially in the surfaces extending radially between the centre lines of the slots and the core axis, and which lies throughout at a less distance from the core axis than the inner cylindrical surface of the core, the guides being so formed as to intercept wire being fed from the feeding head and lead it towards the bases of the slots.

Particular advantage is obtained if the guides are so formed as to provide, when the guides are removed after the windings have been laid in the slots, a suitable amount of slack in the winding ends to enable the winding ends to be secured to the core ends in a suitable position radially spaced beyond the inner cylindrical surface of the core.

According to a further aspect of the invention, a machine for automatically laying a winding in a pair of slots formed in the inner cylindrical surface of a cylindrical core for an electrical machine includes a core holding member adapted to have the core rigidly secured therein, a pair of guide members adapted to be detachably mounted on, or in fixed relation to, the core holding member in suitable positions in relation to the core, a wire-feeding head, means to pivot the core supporting member and wire feeding head in relation to each other about an axis coincident or parallel with the core axis, means arranged to effect relative movement between the feeding head and the core automatically, with the head passing in opposite directions relatively to the core through the central aperture of the core and beyond the ends thereof, and means arranged to provide relative rotation between the core holding member and the head about the stator axis through the angle separating the slots in which the winding is being laid in alternate directions of opposite sense during the periods when the feeding head extends beyond the respective ends of the core, the guide members being adapted to intercept wire being fed from the feeding head and lead it towards the bases of the slots. It is of advantage if the guide members used in the machine are such that, when they are removed after the winding is laid in the slots, a suitable amount of slack is left in the winding ends to enable them to be secured to the core ends in a suitable position radially spaced beyond the inner cylindrical surface of the core.

In order that the invention may be clearly understood and readily put into practice a method of winding a core (hereinafter referred to as a stator) according to the invention, and apparatus therefor, will now be described, by way of example, with reference to the accompanying drawings. In the drawings:

FIG. 1 is a perspective view part broken away, of a stator holder assembly forming part of a core winding apparatus according to the invention, FIG. 2 is an extended schematic view of the mechanism for reciprocating the feed member and rotating the stator holder in the required direction through a predetermined angle at the beginning and end of each stroke of the feed member, FIG. 3 shows a perspective view of a wire dispenser supplying wire to a complete apparatus together with a driving motor, and FIG. 4 is a perspective view of a core holder useable with apparatus embodying the invention.

The stator holder assembly

As shown in FIGURE 1 the stator 1 to be wound is inserted in a closely fitting hollow cylindrical holder 3 and is held in position by means of a locking screw. The cylindrical holder is mounted inside a closely fitting sleeve 5 at one end of which has been mounted a ring gear 6, the gear, sleeve and cylindrical holder being coaxial, and the holder 3 being held in the desired angular position by means of a ball catch 2 which locates in one of a series of dimples in the outside circumference of the holder 3, the dimples being on the intersection of the outside circumference and a plane perpendicular to the holder axis. After location the holder is fixed in position by means of knurl-headed screw 7. The combination of the stator holder, sleeve and gear wheel is mounted with the stator axis horizontal in a bearing support 8, in a roller bearing 9, of which the inner race is a part of the outside circumference of the sleeve, so that the combination has freedom of rotation about the stator axis. The stator and its holder can then be rotated about their common axis by driving gear wheel 47 (FIGURE 2) when it is meshed with the gear 6. The machine can accommodate stators of different sizes by having interchangeable holders, each having the same outer diameter, and each having an internal diameter corresponding to the external diameter of the stator to be used in the holder. The bearing support is mounted on the body 53 (FIGURE 3) in which the indexing mechanism is housed and which forms the base on which the other parts of the machine are mounted.

The feed member

In operation, referring now to FIGURE 2, a feed member 17 is driven so as to execute reciprocating movements parallel to the axis of the stator 1. In these movements a nozzle head 11 passes through the stator bore and moves between extreme positions opposite the two end faces of the stator and spaced from the stator by a distance of the same order of magnitude as the stator diameter.

The reciprocating motion is imparted to the feed member 17 by means of a Scotch yoke mechanism including a radial arm 26 mounted on the end of a vertical camshaft 34. Fixed on the outer end of the radial arm 26 is a pin 21 whose axis is parallel to the axis of rotation of the radial arm and the cam shaft axis. The pin engages in a slot 22 cut along the length of a thick metal strip mounted on and below a sleeve 24, the slot 22 longitudinal axis being perpendicular to the sleeve axis and the plane of the slot width parallel to the plane of rotation of the radial arm 26. The feed member lies in the sleeve 24 and is free to twist about the sleeve axis but movement of the feed member along the axis of the sleeve is prevented by means of a pair of collars 25 (one not shown). The slotted strip is maintained with the slot length parallel to the bed 53 (FIGURE 3) of the machine by having one of its extremities 27 held in a slot in a guide 28. The other extremity is used to operate a trip counter 23 which is used to count the feed member movements.

The fed member and sleeve reciprocate together along the axis of the feed member and parallel to the stator axis, the feed member being supported by two bushes 20', 20'' to prevent any off-axis movements. At the nearer end of the feed member to the stator holder is a counterbored adaptor 16 in which one end of a feed member extension 4 is fitted. At the other end of the feed member is mounted a peg 19 which protrudes at right angles to the feed member axis and locates in a slot in the guide 20'. By appropriate design of the slot any desired rotation of the feed member about its axis can be obtained during the stroke. The ratio of the angular displacement imparted to the feed member during the stroke to the length of the stroke is chosen to suit the angle at which the stator slots are skewed. The feed member extension 4 which is held in the adaptor 16 by means of two grub screws, has, at its extreme end, a head 11 at right-angles to the feed member axis. The wire is passed through a hole drilled along the axis of the head and emerges at a nozzle 12 on the head 11 (FIGURE 1).

A number of feed member extensions would differ in the length of the head 11 as this length is determined by the diameter of the stator and the perpendicular distance between the stator axis and the axis of the feed member, as it is required that the nozzle 12 be fairly close to and directly above (measured radially) the slot in which the wire is to be laid, in order that the wire does not foul the slot edges or fall between the slot insulation and the sides of the slot.

The reciprocating mechanism and feed member assembly is mounted on the base 53 (FIGURE 3) of the machine and is shielded by a cover 54, the fed member extension protruding through a hole 55.

*The stator indexing mechanism*

The vertical cam shaft 34 which operates the reciprocating mechanism is supported by bearings in the body of the machine. Inside the body is mounted indexing apparatus which rotates the stator holder and stator through a predetermined angle about the stator axis at the beginning and end of each stroke of the feed member. The cam shaft is rotated by a motor through bevel gears 30 to cause rotation of a cam 32 affixed to the lower end of the shaft and to cause longitudinal movement of a cam follower 35 in guides 36, to cause rocker arms 37 to rock about a pivot 39. This rocking causes in turn a longitudinal movement of a rack 46 via a link 44, which results in a rotation of a pinion 45 meshing with the rack and of the stator-driving gear wheel 47. As this gear wheel is in mesh with the gear 6 on the stator holder sleeve 5 there is a corresponding rotation of the stator holder 3 and therefore of the stator 1.

The timing of the rotary displacement of the stator with respect to movements of the reciprocating feed member 11 is determined by the shape of the cam, and the amount of this rotation is determined by the ratio of the lengths of the rocker arms as measured from the pivot 39, to one another.

The pivot 39 carries a rack 38 which can be moved in a slide 43 to cause the pivot 39 to slip along the rocker arm and thus vary the ratio of the distances from the pivot to the arm ends. The movement is effected by rotation of a crank 41 on a shaft 40 which carries a pinion 42 meshing with the rack 38. After any adjustment the crank 41 is held in position by a spring loaded pin 48 (FIGURE 3).

*The guide members*

In operation, wire directing guides are mounted on each end face of the stator holder. Each guide consists of a tongue portion 13 and a base portion 14 (FIGURE 1). The base portion 14 is a segment of a flat ring mounted on the annular end face of the stator holder 3 and the tongue portion 13 is a bent wire loop extending away from the end face of the stator, the ends of the wire being secured to the base portion 14. The base portion of a guide is mounted on the annular end face of the stator holder and is located in a groove 18 cut in a raised edge of the stator holder. The guide member 13/14 is located in angular position relative to the stator by means of a pin 10 which engages in one of a number of angularly-spaced holes 15 in the end face of the stator holder 3.

The tongue portion 13 of the guide member is of generally triangular shape with a somewhat rounded tip—the tongue edges being constituted by the wire and being rounded and smooth. The tip of the tongue 13 lies close to the axis of the stator, and on the formation of a loop of wire across the outer face of the tongue—as described below—the tension in the wire draws the loop just formed down to the base of the tongue. When winding is required in slots almost diametrically opposed, then the plane of the tongue portion is nearly normal to the end face of the stator and the base portion 14 occupies about 180° of arc. In the case of a coil having a narrower pitch the base portion 14 occupies a smaller angular portion of the end face of the stator holder 3 and the plane of the tongue portion makes an obtuse angle with the plane of the base member 14, measuring angularly from the base member to the tongue, in order that the tip of the tongue portion is near the stator axis.

The guide member may alternatively be made of sheet material provided that the edge of the tongue is rounded and smooth. A wire tongue has the advantage that easy trial and error adjustment is possible to obtain a peripheral shape which ensures that loops formed across the tongue easily slip down into the slots.

The stroke of the reciprocating feed member 17 is greater than the overall length of the stator with the two guide members fixed on its ends, so that, when a stroke is completed, the nozzle 12 is in a position further from the stator than the tip of the tongue 13 of the guide member. The nozzle 12 does not foul the tongue 13 during its stroke because the stroke is effected when the stator is angularly positioned about the stator axis such that the tongue is turned to lie on one side of the path of the nozzle to give the latter a clear passage through the stator bore.

*The motor*

The machine is driven by a standard electric motor 57 (FIGURE 3) using a worm and wormwheel reduction gear, and is coupled to the cam shaft 34 via a dog clutch 29 (FIGURE 2) on the drive shaft to the bevel gearing 30. The machine can also be manually operated by means of a hand wheel 31 which is also coupled through gearing with the cam shaft. When the handwheel is to be used the dog clutch is released by movement of a lever 33.

*The wire dispenser*

Referring to FIGURE 3 the wire dispenser 49 is a standard dispenser utilising felt pads 50 for controlling the wire tension, with additional tension control by a coil spring 51. The axis of the coil spring is set parallel to the plane of the felt pad friction surfaces, and the wire is passed, after passage through the felt pads, along the length of the coil spring 51, through a wire loop 52 held on the far end of the spring, and thence to the feed member extension 4. The coil spring is set in such a position that when wire is drawn off by the machine the coil spring 51 bends away from the original coil axis position. On any release of tension the coil spring tends to straighten, thus taking up any slack in the wire. The wire to the feed member extension is passed through a hole in the back of the head 11, along the length of head and out through the nozzle 12, and then to the stator slots (FIGURE 1).

Operation

In operation, as stated above, the feed member is driven so as to execute reciprocating movements parallel to the axis of the stator, in which movements the nozzle head 11 passes through the stator bore between extreme positions opposite the two end faces of the stator and spaced from the stator by a distance of the same order of magnitude as the stator diameter. Near the end of each stroke the motion of the nozzle 12 is slowed down considerably by virtue of the Scotch yoke drive mechanism, and during this time the gear 47 is rotated through a predetermined angle causing the stator also to be rotated about its axis through a predetermined angle.

Consider that the reciprocating member has completed a stroke through the bore of the stator from the far end and towards the observer. This stroke will be referred to as the forward stroke and the succeeding stroke in the reverse direction will be referred to as the return stroke irrespective of the direction of these strokes in relation to the position of the bearing 20″ for the reciprocating feed member. The terms "forward stroke" and "return stroke" are not used in the following in the sense that the "forward stroke" is one in which the feed member 17 is extended out of, and the "return stroke" one in which the feed member 17 is returned into, the bearing 20″, as consideration is being given to the formation of a loop in the wire by a return stroke of the feed nozzle 12 along a path in the stator parallel to the forward stroke. The process of loop formation is the same at both ends of the stator and the return stroke for one loop is the forward stroke of the next succeeding loop.

The feed nozzle at the end of the forward stroke is in a position nearer the observer than the tip of the tongue of the guide member on the face of the stator nearer to the observer. During the forward stroke just completed, the stator has been held in a first angular position, which is such that the tongue of the guide member nearer to the observer is at one side of the plane of movement of the nozzle 12 to avoid fouling the nozzle.

At the end of the forward stroke the wire which has just been fed from the nozzle runs back from the nozzle, through the bore of the stator to the bottom of the far end of the slot, where it has been bent to pass around the base of the tongue 13 of the guide member mounted on the remote end face of the stator. The other end of the wire leads from the nozzle to the wire dispenser, and is kept in tension by the felt pads and the bent coil spring so that the wire is kept at the bottom of the slot at the far end.

At this stage, when the nozzle has reached the end of its stroke, the stator holder and the stator are turned through a predetermined angle about the stator axis by the indexing gear. When this occurs the tongue of the guide member describes a circular arc round the stator axis. Since the tip of the tongue is closer to the stator axis than the nozzle, it can pass between the wire and the stator axis than the mouth of the nozzle, and thus the advancing sloping edge of the tongue engages with the wire extending from the nozzle through the stator bore, and causes the wire to be laid across the outer or lower surface of the tongue (as seen in FIGURE 1). As the angular movement of the stator holder and stator progresses, the tension in the wire causes the wire to slip down towards the base of the tongue, with the result that the part of the wire which extends through the interior of the stator bore from the nozzle is pulled by the trailing edge of the tongue radially outwards into the slot from the stator axis.

The rotary displacement of the stator holder and stator terminates when the stator holder has reached a second position where the tongue of the guide member is angularly displaced to the opposite side of the axial plane through the nozzle from the starting position. The nozzle then carries out a return stroke towards the face of the stator, then through the bore of the stator and out to a position beyond the end of the tongue of the guide member on the further face of the stator. During the initial part of the return stroke, while the nozzle is moving towards the stator face, the tension in the wire ensures that the wire which is running back to the nozzle, falls across the trailing edge of the tongue and forms a loop laid across the outer face of the tongue, any slack in the wire being taken up by the coil spring on the dispenser. As the feed member continues its return stroke the tension in the wire causes the loop laid across the tongue to complete its movement down towards the base of the tongue. The completed loop then lies across the base of the tongue on its outer side as is shown in FIGURE 1 for the wound turns of the coil.

The leading edge at the base of the tongue is so positioned that when the loop is formed, this end of the base of the tongue is directly opposite the end of the slot into which the wire is to be laid on the return stroke. Consequently the wire is laid into the end of the slot in the initial part of the travel of the nozzle into the bore of the stator, and during the subsequent motion of the nozzle through the bore and out at the far end, the wire is held in the bottom of the near end of the slot by virtue of the tension in the wire between the nozzle and the base of the tongue.

The position of the parts of the machine is then the same relatively to the return stroke as they were initially relatively to the forward stroke. Thereafter the operation proceeds as before, the stator holder and stator are turned back through the predetermined angle about the stator axis, and at the end of the rotation a second forward stroke of the nozzle occurs. During these stages a loop of wire is engaged round the tongue of the guide member at the far end of the stator in the manner above described for the guide member at the near end. By repeating the above process a number of complete loops are formed and constitute a multi-turn coil winding in the two chosen slots.

The base of the tongue is arranged at such a distance from the stator face when measured in the direction of the rotor axis, that on removal of the guide member the loop ends projecting beyond the slots can be laid down along the outer circumference of the stator end face. Also, the guide member is clear of the end face to accommodate any coils which may have been previously formed with parts laid along the outer circumference of the stator end face.

The guide members can readily be moved after a coil has been wound by the machine, by lifting the locating pin 10 holding the base 14 of the guide against the end face of the stator holder 3. The guide can then be tilted about the base line of its tongue portion 13 so that the base portion 14 moves angularly away from the end face of the stator and the tongue portion turns towards parallelism with the end face of the stator. When the tongue is parallel to the end face of the stator the guide member can readily be removed in a radial direction from the stator axis, the tongue portion slipping out from under the end portion of the coil. Guide members can then be placed on the end faces of the stator in some other angular position suitable for winding another coil of the winding, and the stator holder turned to a corresponding position in the sleeve 5 of the stator holder assembly, being located as before by the ball catch seating in the appropriate position and being locked in position by the knurl-headed screw 7. By suitable connections between the ends of a series of coils so wound on a stator, most of the conventional stator windings can be formed. So that the coils may be wound, without breaking the wire, in the appropriate direction relative to one another, the direction of winding can be reversed in suitable cases by means of the switch 56 (FIGURE 3).

The invention is not limited to windings made in this way—the apparatus can be adapted to wind one form of wave winding by causing the gear wheel 6 to rotate always in the same direction, and in suitable controlled steps to ensure that the wire is directed into a succession of slots spaced uniformly, or nonuniformly as required, by guides of the required size placed in appropriate positions on the stator holder end faces, on successive strokes of the nozzle member.

Such successive rotations of the stator can be obtained by transmitting the drive from the cam shaft to the gear 47 via a suitable Geneva movement or the like.

The invention can also be adapted to wind a number of coils simultaneously. Supposing for example that three coils are to be wound at the same time then three feed wires can be fed through three nozzles carried on a common feed member extension, which wires are passed simultaneously through the stator bore and are engaged by one each of three guides on each end face of the stator holder.

This can only be effected if each guide occupies less than 120° of arc round the stator holder.

It is to be understood that the machine embodying the invention is not limited to one in which the indexing mechanism rotates the stator holder through a predetermined angle about the stator axis at the beginning and end of each stroke of the feed member.

The indexing mechanism may equally well be such as to rotate the head of the feed member through the required angle at the beginning and end of each stroke and then the stator holder may be fixed. The pinion 45 could, for example, be geared to a pinion on the feed member 17 or a part connected to it.

In the described embodiment the stroke of the feed member is constant but it may be advantageous to have a length of stroke which can be varied. This may be carried out, for example, by having the radial arm 26 of the Scotch yoke mechanism of variable length.

What is claimed is:

1. A machine for automatically laying a winding in a pair of slots formed in the inner cylindrical surface of a cylindrical core for an electrical machine, including a core holding member for holding the core rigidly, wire feeding means including a member supported for linear reciprocating movement parallel to the axis of said core and provided with a nozzle head extending perpendicularly to said axis and outward therefrom a distance that is slightly less than the radius of said inner cylindrical surface of said core and substantially greater than the largest radial dimension of said reciprocating member, means for effecting reciprocating movement of said member supported for reciprocating movement with the head passing in opposite directions relatively to the core through the central aperture of the core and beyond the ends thereof, the path of the outer end of said nozzle head lying throughout at less distance from said core axis than the inner cylindrical surface of said core, means for providing relative rotation between the core holding member and the head about the core axis through the angle separating the slots in which the winding is being laid in alternate directions of opposite sense during the periods when the feeding head extends beyond the respective ends of the core, and a pair of guide members detachably positioned to intercept wire being fed from the feeding head and lead it towards the bases of the slots, said guide members consisting of a base portion and tongue portion, said base portion being formed from a section of a flat ring, and said core holder being provided with an annular groove adapted to receive the outer edge of the base portion, the core holder being provided also with a plurality of apertures formed in the annular end face of the core holder at angularly spaced positions around a circle centered on the core holder axis, and the base members also being provided with an aperture whereby the base members can be located by means of a pin or the equivalent passed through a hole in the base member and into a selected one of the holes in the core holder.

2. A machine for automatically laying a winding in any pair of slots formed in the inner cylindrical surface of a cylindrical core for an electrical machine, including a core holding member for holding the core rigidly, wire feeding means including a member supported for linear reciprocating movement parallel to the axis of said core and provided with a nozzle head extending perpendicularly to said axis and outward therefrom a distance that is slightly less than the radius of said inner cylindrical surface of said core and substantially greater than the largest radial dimension of said reciprocating member, means for effecting reciprocating movement of said member supported for reciprocating movement with the head passing in opposite directions relatively to the core through the central aperture of the core and beyond the ends thereof, the path of the outer end of said nozzle head lying throughout at less distance from said core axis than the inner cylindrical surface of said core, means for providing relative rotation between the core holding member and the head about the core axis through the angle separating the slots in which the winding is being laid in alternate directions of opposite sense during the periods when the feeding head extends beyond respective ends of the core, and a pair of guide members, each consisting of a tongue and base portion which are detachable from one another, the base portion being adapted to be mounted in any of a plurality of angularly spaced positions at the end face of the core holder, and the tongue portion consisting of a bent wire loop of generally triangular shape having a rounded tip and extending away from the end face of the core holder with the ends of the wire attached to the base portion, said tongue portion being inclined to be nearer the axis at the tip than at the base and being at the tip nearer the axis than is the outer end of said nozzle head, said guide members each being detachably, but fixedly, positioned entirely outside and on opposite sides of the central aperture in said core, said guide members being unconnected and adapted to intercept wire being fed from the feeding head and lead it towards the bases of the slots.

References Cited in the file of this patent

UNITED STATES PATENTS

| 1,431,947 | Gysel | Oct. 17, 1922 |
| 1,977,828 | Laib et al. | Oct. 23, 1934 |
| 2,632,602 | Weis | Mar. 24, 1953 |
| 2,640,652 | Harvey | June 2, 1953 |

FOREIGN PATENTS

| 152,366 | Switzerland | Apr. 16, 1932 |